(12) United States Patent
Kim

(10) Patent No.: US 11,126,841 B2
(45) Date of Patent: Sep. 21, 2021

(54) METHOD FOR CODING IRIS PATTERN

(71) Applicant: 3E CO., LTD., Gyeonggi-do (KR)

(72) Inventor: Min Ho Kim, Gyeonggi-do (KR)

(73) Assignee: 3E CO. LTD., Gyeonggi-Do (KR)

( * ) Notice: Subject to any disclaimer, the term of this patent is extended or adjusted under 35 U.S.C. 154(b) by 51 days.

(21) Appl. No.: 16/476,371

(22) PCT Filed: Aug. 14, 2017

(86) PCT No.: PCT/KR2017/008839
§ 371 (c)(1),
(2) Date: Sep. 9, 2019

(87) PCT Pub. No.: WO2018/128241
PCT Pub. Date: Jul. 12, 2018

(65) Prior Publication Data
US 2020/0012840 A1    Jan. 9, 2020

(30) Foreign Application Priority Data

Jan. 9, 2017  (KR) .................. 10-2017-0002818

(51) Int. Cl.
*G06K 9/00* (2006.01)
*G06K 9/46* (2006.01)
*G06K 9/48* (2006.01)

(52) U.S. Cl.
CPC ......... *G06K 9/0061* (2013.01); *G06K 9/4642* (2013.01); *G06K 9/48* (2013.01)

(58) Field of Classification Search
CPC ...... G06K 9/0061; G06K 9/4642; G06K 9/48; G06K 9/00597
See application file for complete search history.

(56) References Cited

U.S. PATENT DOCUMENTS 6,546,121 B1 *  4/2003  Oda ................... G06K 9/00597
                                                    382/117
7,756,301 B2 *  7/2010  Hamza ............... G06K 9/00597
                                                    382/117
7,796,784 B2 *  9/2010  Kondo ............... G06K 9/00597
                                                    382/117

(Continued)

FOREIGN PATENT DOCUMENTS

KR    10-2002-0060271 A    7/2002
KR    10-2003-0071270 A    9/2003

(Continued)

OTHER PUBLICATIONS

International Search Report (ISR) from corresponding PCT Application No. PCT/KR2017/008839, dated Nov. 23, 2017.

*Primary Examiner* — Xuemei G Chen
(74) *Attorney, Agent, or Firm* — Hamre, Schumann, Mueller & Larson, P.C.

(57) ABSTRACT

According to one embodiment of the present invention, a method for coding an iris pattern divides an iris area into a plurality of sectors on the basis of the assumption that a user's pupil and iris are not circular and then can code an iris pattern included in each sector. According to the present invention, an error occurrence frequency can be minimized compared with a case that an iris pattern is coded on the basis of the assumption that a pupil and an iris are circular.

8 Claims, 7 Drawing Sheets

(56) References Cited

U.S. PATENT DOCUMENTS

| | | | |
|---|---|---|---|
| 2004/0037452 A1* | 2/2004 | Shin | G06K 9/00597 |
| | | | 382/117 |
| 2006/0147094 A1* | 7/2006 | Yoo | G06K 9/0061 |
| | | | 382/117 |
| 2007/0140531 A1* | 6/2007 | Hamza | G06K 9/00597 |
| | | | 382/117 |
| 2009/0220126 A1* | 9/2009 | Claret-Tournier | G06K 9/0061 |
| | | | 382/117 |
| 2010/0014718 A1* | 1/2010 | Savvides | G06T 7/11 |
| | | | 382/117 |
| 2010/0284576 A1* | 11/2010 | Tosa | G06K 9/0061 |
| | | | 382/117 |
| 2012/0140992 A1* | 6/2012 | Du | G06K 9/0061 |
| | | | 382/117 |
| 2012/0308089 A1* | 12/2012 | Lee | G06K 9/00597 |
| | | | 382/117 |
| 2015/0161472 A1* | 6/2015 | Yoshioka | G06K 9/0061 |
| | | | 382/197 |
| 2016/0014121 A1* | 1/2016 | Perna | G07C 9/37 |
| | | | 726/4 |
| 2016/0019420 A1* | 1/2016 | Feng | G06K 9/00906 |
| | | | 382/117 |
| 2016/0239702 A1* | 8/2016 | Making | G06T 5/005 |
| 2017/0091520 A1* | 3/2017 | Ishii | G06K 9/00617 |
| 2017/0344110 A1* | 11/2017 | Yoshioka | A61B 3/152 |
| 2018/0018515 A1* | 1/2018 | Spizhevoy | G06K 9/00604 |
| 2018/0168446 A1* | 6/2018 | Kim | G07C 9/37 |
| 2018/0173977 A1* | 6/2018 | Kim | G06K 9/0061 |

FOREIGN PATENT DOCUMENTS

| | | |
|---|---|---|
| KR | 10-2005-0025927 A | 3/2005 |
| KR | 10-2012-0135381 A | 12/2012 |

\* cited by examiner

METHOD FOR CODING IRIS PATTERN

CROSS-REFERENCE TO RELATED APPLICATIONS

This application is a national phase application of PCT Application No. PCT/KR2017/008839, filed on 14 Aug. 2017, which claims priority to Korean Patent Application No. 10-2017-0002818, filed on 9 Jan. 2017. The entire disclosure of the applications identified in this paragraph is incorporated herein by references.

FIELD

The present invention relates to a method of coding iris patterns and, more particularly, to a method of coding iris patterns, the method including dividing an iris area into a plurality of sectors and then coding iris patterns included the respective sectors, on the assumption that the pupil and the iris of a user are not circular.

BACKGROUND

Biometrics recognizes different characteristics of people, such as a fingerprint, face, vein, voice, and iris, and uses such characteristics as passwords in order to identify users. That is, characteristics of the human body, such as a fingerprint, face, and iris, and characteristics in actions, such as gait and signature, are measured using instruments to be used as personal identifiers.

In the biometrics, iris recognition technology uses information regarding the iris of an eyeball having unique characteristics according to individuals. Iris recognition technology has recently come into prominence, due to higher reliability, immutability, recognition rate of data thereof, compared to fingerprint or face recognition technology.

Iris recognition technology generally includes dividing the area of the iris of a user into a plurality of sectors and coding iris patterns included in the respective sectors using two dimensional (2D) Gabor transformation.

FIG. 1 is an image illustrating a process of dividing an iris area into a plurality of sectors according to a related-art method.

In the related art, the iris area was divided into sectors, as illustrated in FIG. 1, in order to code iris patterns. Specifically, after a plurality of circles and radial shaped patterns surrounding the center of a pupil are illustrated on the iris area, each of areas divided by the plurality of circles and radial shaped patterns is defined as a single sector. Afterwards, iris patterns included in the sectors are coded.

However, this sectoring process of the related art is performed on the assumption that the pupil and the iris of the user are concentric circles having the same center and thus may have errors since the pupil and the iris of the user are not actually circular.

Accordingly, there has been an increasing demand for a method of coding iris patterns performed on the assumption that the pupil and the iris of a user are not actually circular, the method including dividing the area of the iris of the user into a plurality of sectors and coding iris patterns included in the respective sectors.

SUMMARY

Technical Problem

Accordingly, the present invention has been made keeping in mind the above problems occurring in the prior art, and an objective of the present invention is to provide a method of coding iris patterns, the method including dividing an iris area into a plurality of sectors and then coding iris patterns included the respective sectors.

In addition, also provided is a method of coding iris patterns, the method being able to minimize error ratios in iris recognition by accurately generating sectors each of which only includes an iris area.

The objective of the present invention is not limited to the aforementioned description, and other objects not explicitly disclosed herein will be clearly understood by those skilled in the art to which the present invention pertains from the description provided hereinafter.

Technical Solution

In order to accomplish the above object, according to an embodiment the present invention, a method of coding iris patterns may include the steps of: calculating distances from a center of a pupil to boundaries between the pupil and an iris; calculating an average of the distances from the center of the pupil to the boundaries between the pupil and the iris by a predetermined second angular interval; determining distances from the boundaries between the pupil and the iris to points at which iris data is to be obtained by the second angular interval; generating blocks from pixels included in an area from the boundaries between the pupil and the iris to the points at which the iris data is to be obtained; generating specific areas by aligning the pixels of the blocks in accordance with distances; dividing the blocks into a predetermined number of sectors in accordance with positional information of the pixels of the specific areas; and coding iris patterns included in the sectors.

According to an embodiment the present invention, in the step of calculating the distances from the center of the pupil to the boundaries between the pupil and the iris, the distances from the center of the pupil to the boundaries between the pupil and the iris may be calculated within a predetermined angular range by a predetermined first angular interval.

According to an embodiment the present invention, the step of determining the distances from the boundaries between the pupil and the iris to the points at which the iris data is to be obtained may include a step of determining the distances to the points at which the iris data is to be obtained by adding a predetermined distance to the boundaries between the pupil and the iris.

According to an embodiment the present invention, the step of determining the distances to the points at which the iris data is to be obtained by adding the predetermined distance to the boundaries between the pupil and the iris may include a step of determining the distances to the points at which the iris data is to be obtained by adding distances varying in accordance with angles of rotation.

According to an embodiment the present invention, the step of determining the distances to the points at which the iris data is to be obtained by adding the distances varying in accordance with the angles of rotation may include determining the distances to the points at which the iris data is to be obtained by adding greater values to portions in lateral direction of the pupil than values added to a portion in a downward direction of the pupil.

According to an embodiment the present invention, the step of generating the blocks may include a step of generating the blocks including the pixels, with a distance from the center of the pupil of each of the pixels being a distance between an average of the distances to the boundaries between the pupil and the iris and a corresponding point of the points at which the iris data is to be obtained, and an angle of rotation of each of the pixels being in an area defined by the following formula: $\theta_\alpha+(n-1)\cdot\varepsilon\leq\theta\leq\theta_\alpha+n\cdot\varepsilon$, where the n is an integer equal to or greater than 1, and the θ is the angle of rotation of each of the pixels.

According to an embodiment the present invention, the step of generating the specific areas by aligning the pixels of the blocks in accordance with the distances may include a step of generating the specific areas by aligning the pixels having the same distances from the center of the pupil.

In order to accomplish the above object, according to another embodiment the present invention, an apparatus for coding iris patterns may include: at least one processor; a memory loading a computer program executed by the processors; and a storage storing the computer program able to code iris patterns, wherein the computer program includes operations of: calculating distances from a center of a pupil to boundaries between the pupil and an iris; calculating an average of the distances from the center of the pupil to the boundaries between the pupil and the iris by a predetermined second angular interval; determining distances from the boundaries between the pupil and the iris to points at which iris data is to be obtained by the second angular interval; generating blocks from pixels included in an area from the boundaries between the pupil and the iris to the points at which the iris data is to be obtained; generating specific areas by aligning the pixels of the blocks in accordance with distances; dividing the blocks into a predetermined number of sectors in accordance with positional information of the pixels of the specific areas; and coding iris patterns included in the sectors.

Advantageous Effects

As described above, the method of coding iris patterns is performed on the assumption that the pupil and the iris of a user are not circular, and can realize the effect of minimizing the occurrence of errors compared to cases in which iris patterns are coded on the assumption that the pupil and the iris are circular.

DETAILED DESCRIPTION

Figure 1:
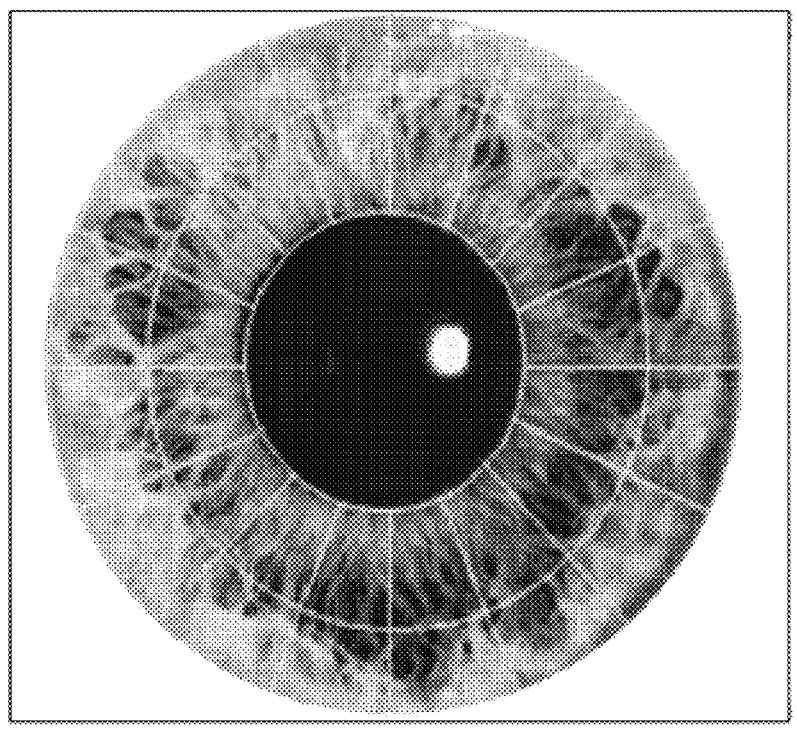
FIG. 1 is an image illustrating a process of dividing an iris area into a plurality of sectors according to a related-art method.

Hereinafter, exemplary embodiments of the present disclosure will be described in detail with reference to the accompanying illustrative drawings. Advantages, features, and methods of realizing such advantages and features of the present invention will be more clearly understood from the following embodiments when taken in conjunction with the accompanying drawings. The present invention should not be construed as being limited to these embodiments and may be embodied in many different forms. The embodiments set forth herein are provided for illustrative purposes to fully convey the concept of the present invention to those skilled in the art to which the present invention pertains. The scope of the present invention disclosure shall be defined by the appended Claims. Throughout this document, the same reference numerals and symbols will be used to designate the same or like components.

All terms (including technical and scientific terms) used herein should be interpreted as having meanings and concepts consistent with their meaning interpretable to those skilled in the art to which the present invention pertains. In addition, terms, such as those defined in commonly used dictionaries, will not be interpreted in an idealized or overly formal sense unless expressly so defined herein.

As used herein, singular forms are intended to include plural forms unless the context clearly indicates otherwise. It will be understood that the term "comprise" and any variations thereof used herein are intended to cover non-exclusive inclusions of one or more other components, steps, operations, and/or devices, unless explicitly described to the contrary.

Figure 2:
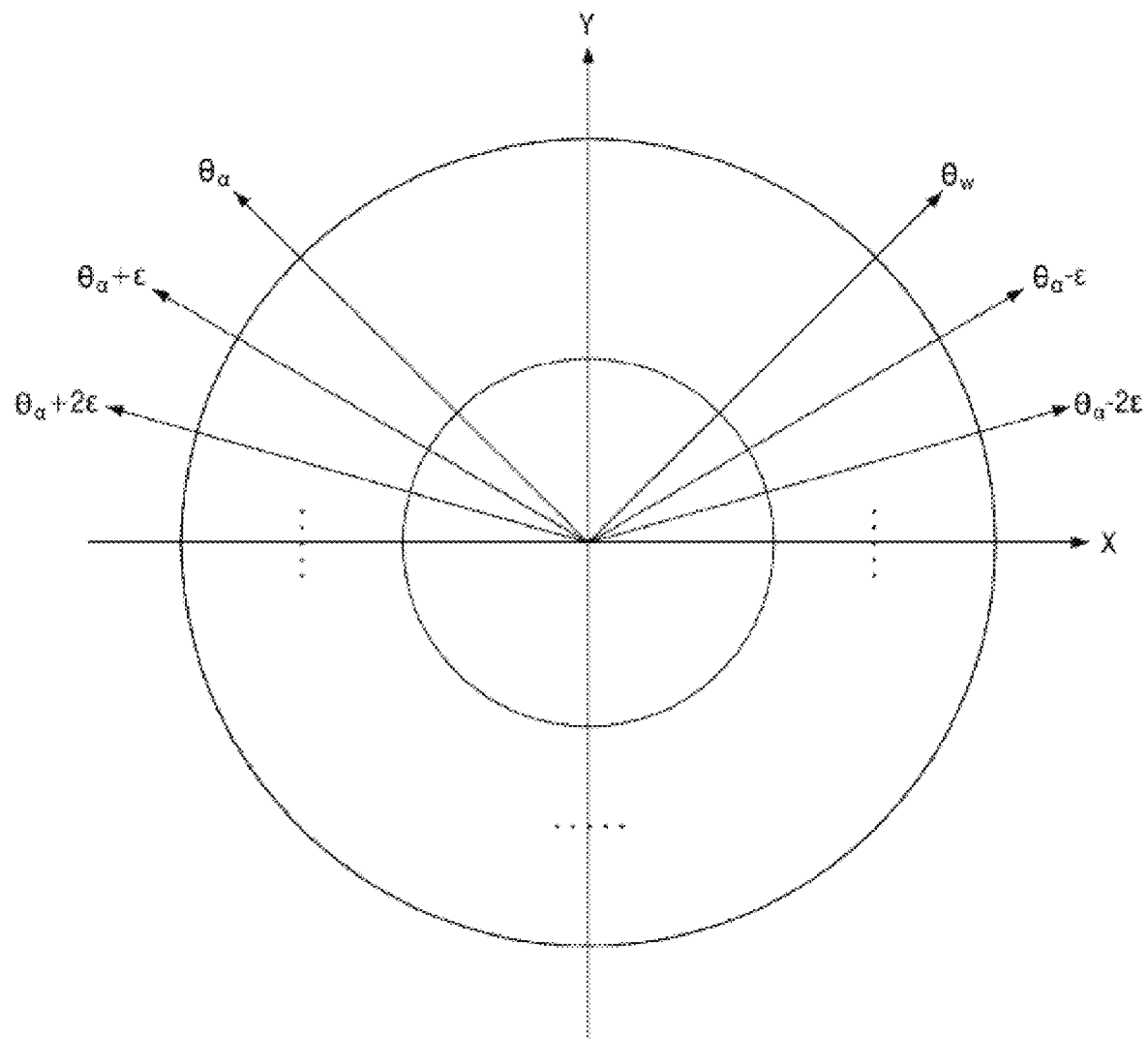
FIG. 2 is a diagram illustrating a process of calculating distances from the center of a pupil to boundaries between the pupil and the iris according to an embodiment of the present invention.

FIG. 2 is a diagram illustrating a process of calculating distances from the center of a pupil to boundaries between the pupil and the iris according to an embodiment of the present invention.

Hereinafter, for the sake of brevity, subjects performing respective steps will be omitted in the following description. Here, a method of coding iris patterns according to embodiments of the present invention may be performed by an electronic device in which a program or application able to perform the same method is installed.

Alternatively, steps to be described later may be performed by modules of the above-described program or an application. The modules may be provided in an addressable storage medium or may be provided to cause one or more processors to execute. For example, the modules includes components, such as software components, object-oriented software components, class components, and task components, in addition to processes, functions, attributes, procedures, subroutines, segments of program codes, drivers, firmware, micro-codes, circuits, data, database, data structures, tables, arrays, and variables. Functions provided by the components and the modules may be combined into a smaller number of components or modules or may be further divided into components and modules.

First, to code iris patterns, distances from the center of the pupil to the boundaries between the pupil and the iris are calculated. Here, the distances from the center of the pupil to the boundaries between the pupil and the iris may vary in accordance with the angles of rotation, since the human iris is not actually circular even though the human iris is generally regarded as being circular.

Accordingly, the distances from the center of the pupil to the boundaries between the pupil and the iris may be calculated as a first angular distance previously set within a predetermined angular range.

For example, the distances to the boundaries between the pupil and the iris may be calculated in an area in which the angle of rotation is equal to or greater than $\theta_\alpha$ and equal to or less than $\theta_\omega$ by a predetermined angular interval when the center or the pupil is set as the origin.

Since there is high possibility that iris data may not be obtained due to the eyelid in the area in which the angle of rotation is equal to or greater than $\theta_\alpha$ and equal to or less than $\theta_\omega$, the distances to the boundaries between the pupil and the iris is calculated only in the area in which the angle of rotation is equal to or greater than $\theta_\alpha$ and equal to or less than $\theta_\omega$ by the predetermined angular interval.

Here, if a predetermined first angular interval is 0.5°, a distance from the center of the pupil to a boundary between the pupil and the iris at an angle of rotation of $\theta_\alpha$, a distance from the center of the pupil to a boundary between the pupil and the iris at an angle of rotation of $\theta_\alpha+0.5°$, a distance from the center of the pupil to a boundary between the pupil and the iris at an angle of rotation of $\theta_\alpha+1°$, and a distance from the center of the pupil to a boundary between the pupil and the iris at an angle of rotation of $\theta_\omega$ may be calculated.

When the distances from the center of the pupil to the boundaries between the pupil and the iris are calculated at the predetermined first angular interval in an area in which the angle of rotation is greater than $\theta_\alpha$ and smaller than $\theta_\omega$, an average of distances calculated at a predetermined second angular interval is calculated.

If the predetermined second angular interval according to an embodiment of the present invention is ε, an average of distances to boundaries between the pupil and the iris calculated by the predetermined first angular interval at an angle of rotation $\theta_\alpha \leq \theta \leq \theta_\alpha+\varepsilon$, an average of distances to the boundaries between the pupil and the iris calculated by the predetermined first angular interval at an angle of rotation $\theta_\alpha+\varepsilon \leq \theta \leq \theta_\alpha+2\varepsilon$, and the like, may be calculated.

When the average of the distances to the boundaries between the pupil and the iris by the predetermined first angular interval at an angle of rotation $\theta_\alpha \leq \theta \leq \theta_\alpha+n\cdot\varepsilon$ is indicated by $S_n$, the average $S_n$ may be calculated by the following formula.

$$S_n = \frac{1}{2\varepsilon}\sum_{m=1}^{2\varepsilon} L(2\varepsilon(n-1)+m), \left(1 \leq n \leq \frac{\omega-\alpha}{\varepsilon}\right) \quad \text{[Formula 1]}$$

When the above-described process is applied, the distances from the center of the pupil to the boundaries between the pupil and the iris may be determined within a predetermined angular range. When the distances from the center of the pupil to the boundaries between the pupil and the iris are determined, the distances from the boundaries between the pupil and the iris to a point at which iris data is obtainable are determined.

Figure 3:
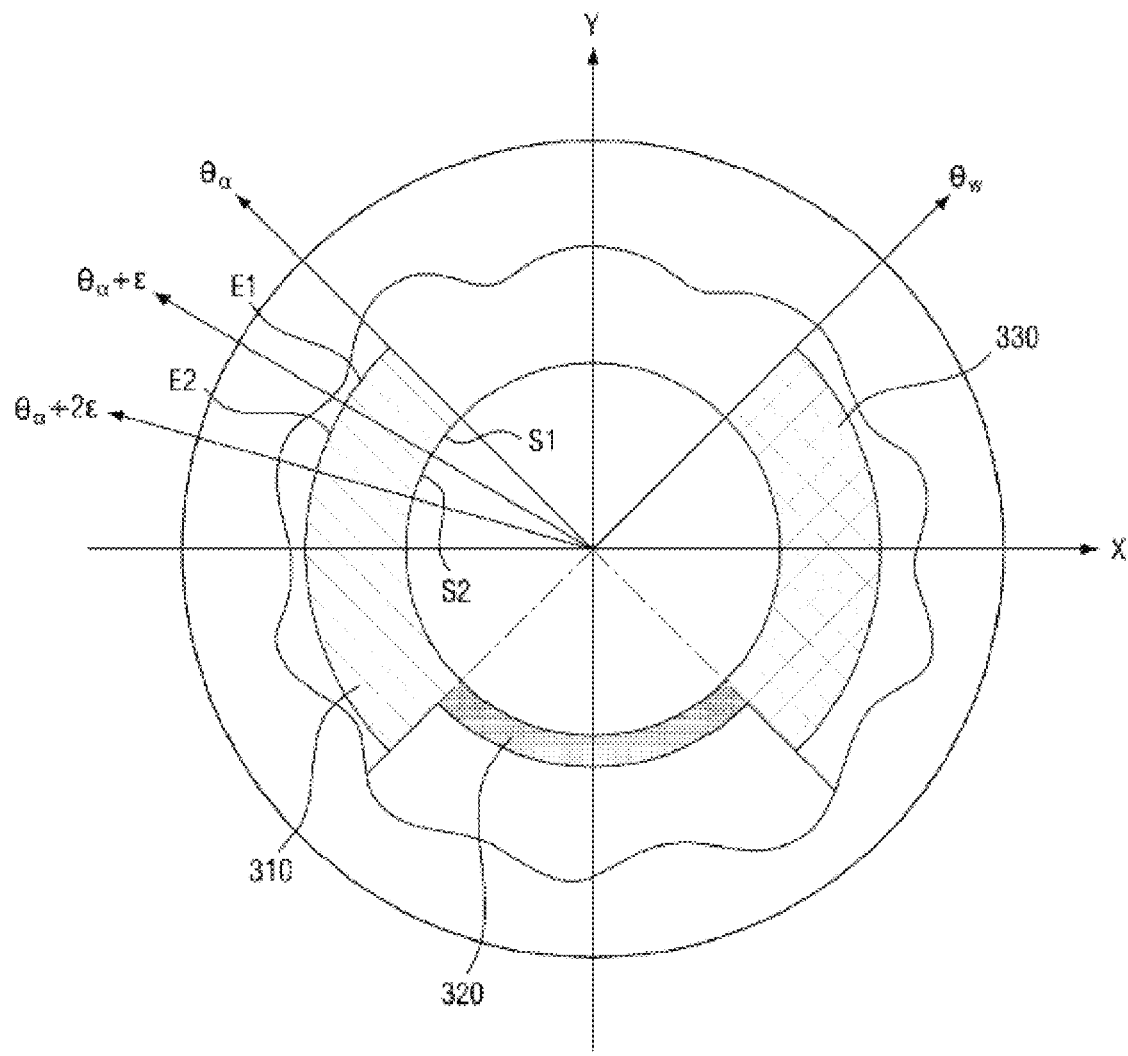
FIG. 3 is a diagram illustrating a process of determining distances from boundaries between the pupil and the iris to a point at which iris data is to be obtained according to an embodiment of the present invention.

FIG. 3 is a diagram illustrating a process of determining distances to boundaries between the pupil and the iris to a point at which iris data is to be obtained according to an embodiment of the present invention.

When the distances from the center of the pupil to the boundaries between the pupil and the iris, in accordance with the angles of rotation, are determined, a distance to a point at which the iris data is to be obtained is determined.

According to an embodiment of the present invention, the distance to the point at which the iris data is to be obtained may be calculated by adding a predetermined distance to the boundaries between the pupil and the iris.

Here, the predetermined value added to the boundaries between the pupil and the iris may vary in accordance with the angles of rotation. This is because there is higher possibility that a portion of the eye area in a downward direction may be covered by the eyelid, even though there is lower possibility that lateral portions (i.e. right and left portions) of an image captured from an eye area of a user may be covered with an eyelid.

Accordingly, in the predetermined value added to the boundaries between the pupil and the iris, the predetermined value in the lateral direction may be greater than the predetermined value in the downward direction.

A specific method of calculating the distance to the point at which at which the iris data is to be obtained may be represented by the following formula.

$$E_n = \begin{cases} S_n + \{(irisR - S_n) \times 0.83\}, & \begin{pmatrix} 1 \leq n \leq \beta-\alpha, \gamma-\alpha \leq \\ n \leq \omega-\alpha \end{pmatrix} \\ S_n + \{(irisR - S_n) \times 0.50\}, & \beta-\alpha \leq n \leq \gamma-\alpha \end{cases} \quad \text{[Formula 2]}$$

Here, irisR is a predetermined constant set as the radius of the iris of the user.

A first area 310 and a third area 330 corresponding to the lateral portions of the iris are not significantly interfered with the eyelid. The distances to the point at which at which the iris data are to be obtained is determined by adding $(irisR-S_n)\times 0.83$ to $S_n$ determined to be the distances from the center of the pupil to the boundaries between the pupil and the iris. Here, in consideration of the possibility that a portion of the iris in the second area 320 may be covered with the eyelid, a value obtained by adding $(irisR-S_n)\times 0.50$ to $S_n$ is determined to be the distance to the point at which the iris data is to be obtained.

When the distance to the point at which the iris data is to be obtained is determined by the above-described process, the iris area is blocked by the predetermined second angular interval.

Figure 4:
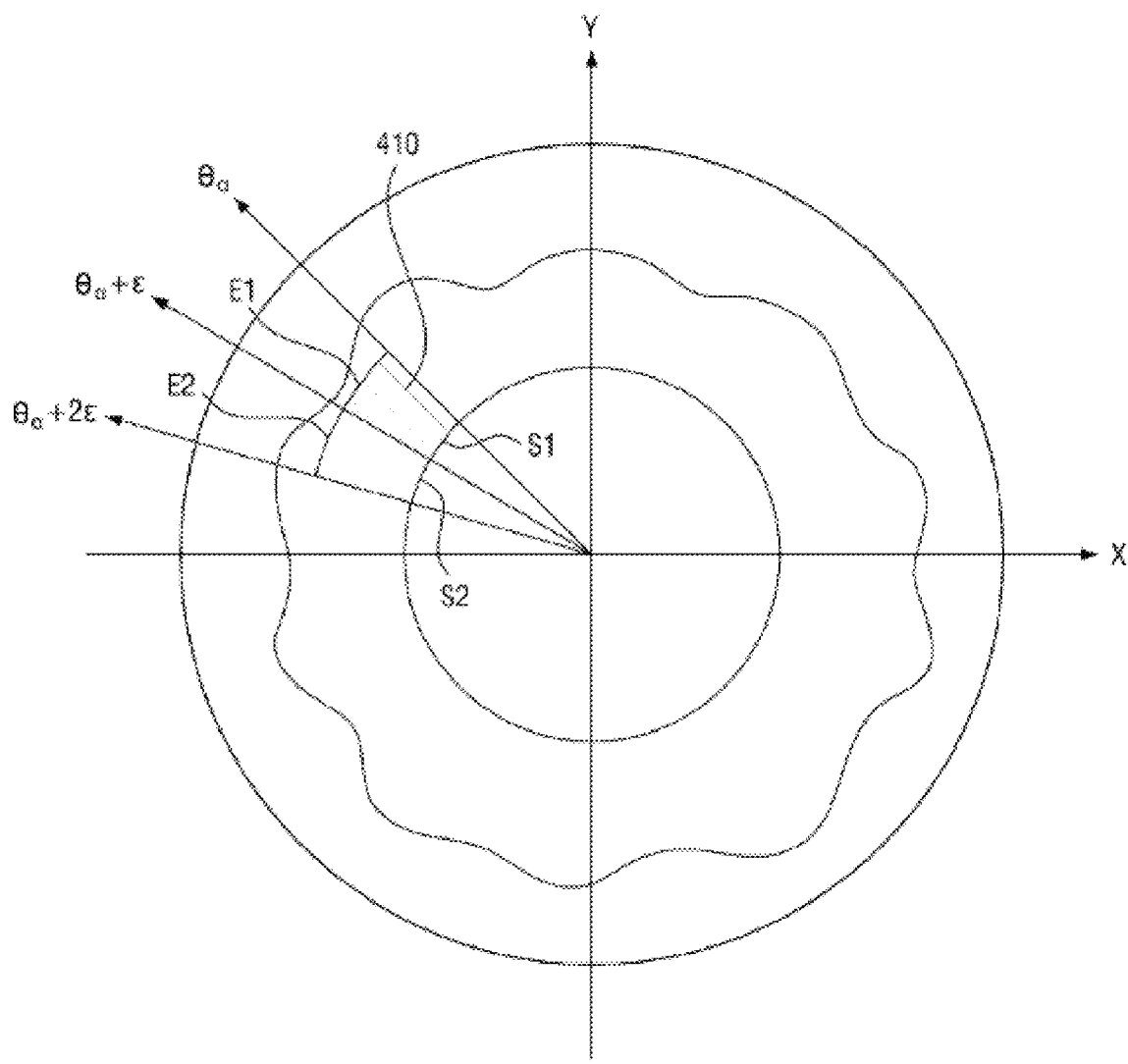
FIG. 4 is a diagram illustrating a process of generating blocks according to an embodiment of the present invention.

FIG. 4 is a diagram illustrating a process of generating blocks according to an embodiment of the present invention.

When (1) the average $S_n$ of the distances from the center of the pupil to the boundaries between the pupil and the iris and (2) the distance $E_n$ to the point at which the iris data is to be obtained are determined by the predetermined second angular interval, i.e. an interval ε°, by the above-described process, the area from the average of the distances from the center of the pupil to the boundaries between the pupil and the iris to the point at which the iris data is to be obtained by the predetermined second angular interval ε°.

Herein, the area in which the distance is $S_n$ to $E_n$ and the angle of rotation is $\theta_\alpha+(n-1)\cdot\varepsilon \leq \theta \leq \theta_\alpha+n\cdot\varepsilon$ (where n is an integer equal to or greater than 1) is defined as a "block". For example, where n=1, a first block 410 comprised of pixels having an angle of rotation $\theta_\alpha \leq \theta \leq \theta_\alpha+\varepsilon$ and being within a distance $S_1$ to $E_1$.

In the same manner, where n=2, a second block 440 comprised of pixels having an angle of rotation $\theta_\alpha+\varepsilon \leq \theta \leq \theta_\alpha+2\varepsilon$ and being within a distance $S_2$ to $E_2$.

$(\omega-\alpha)/\varepsilon$ number of blocks may be generated by generating blocks from $\theta_\alpha$ to $\theta_\omega$ by the angular interval ε° in the same manner.

When the blocks are generated by the predetermined second angular interval by the above-described process, specific areas are generated in accordance with positional information of pixels of each of the blocks.

Figure 5:
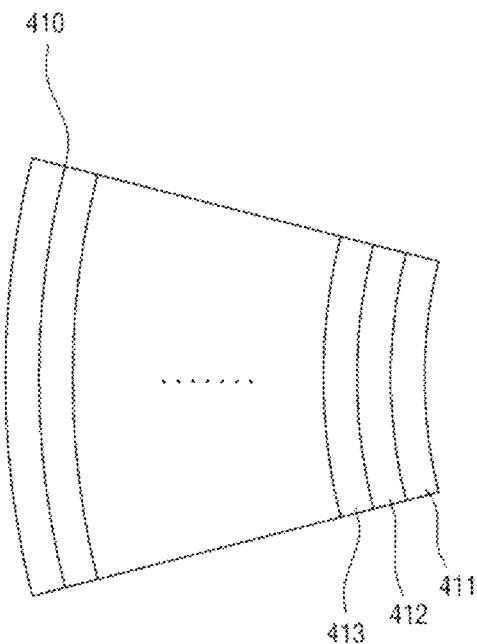
FIG. 5 is a diagram illustrating a process of generating specific areas in accordance with positional information of pixels of each of the blocks according to an embodiment of the present invention.

FIG. 5 is a diagram illustrating a process of generating specific areas in accordance with positional information of pixels of each of the blocks according to an embodiment of the present invention.

The method of coding iris patterns according to an embodiment of the present invention generates the specific areas in accordance with the positional information of the pixels of each of the blocks.

The specific areas according to an embodiment of the present invention may be generated to be aligned in accordance with distances of the pixels of the blocks. Specifically, a first specific area 411 may be generated by aligning pixels having the same distance from the center of the pupil, and then a second specific area 412 may be generated in the same manner.

Each of the pixels included in each of the specific areas may be represented by the following formula.

$$B_n = \frac{1}{\varepsilon} \sum_{m=1}^{\frac{\varepsilon}{2}} P[(S_1 + (n-1)) \times \cos(\theta_\alpha + 2(m-1)),$$
$$(S_1 + (n-1) \times \sin\theta_\alpha + 2(m-1)), (1 \le n \le E_1 - S_1)$$ [Formula 3]

Here, P(x,y) indicates positional information of each pixel.

When the specific areas are generated by the above-described process, positional information of all of the pixels of the blocks may be specified.

When the positions of the pixels of the blocks are specified, the blocks are divided into a plurality of number of areas to produce a predetermined number of sectors, and iris patterns included in the respective sensors are coded.

Figure 6:
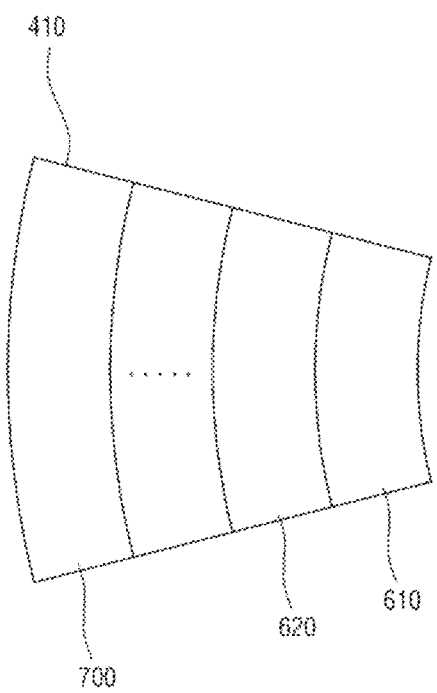
FIG. 6 is a diagram illustrating a process of generating a predetermined number of sectors by dividing the blocks into a plurality of areas according to an embodiment of the present invention.

FIG. 6 is a diagram illustrating a process of generating a predetermined number of sectors by dividing the blocks into a plurality of areas according to an embodiment of the present invention.

When the positional information of the pixels of the blocks is specified by the plurality of specific areas, the predetermined number of sectors is generated by dividing the blocks into the plurality of areas. Afterwards, the iris patterns included in the sectors are coded and then are stored. The method of coding iris patterns according to an embodiment of the present invention may use, but is not limited to, secondary Gabor transformation. It should be understood that other general-use methods may be used.

The sectors generated by dividing the blocks into the predetermined number of areas according to an embodiment of the present invention may be represented by the following formula. Here, a case in which the blocks are divided into ten (10) sectors will be discussed by way of example.

$$C_n = \frac{1}{1/10} \sum_{m=1}^{1/10} B_m, (1 = E_1 - S_1, 1 \le n \le 10),$$ [Formula 4]

Although the above-described process has been described as being applied to the first block 410, the same process may be applied to all of the blocks generated by the process described above with reference to FIG. 4.

In addition, data obtained by coding the iris patterns included the sectors of the blocks may be stored in a database (DB) to be used to authenticate a user.

Figure 7:
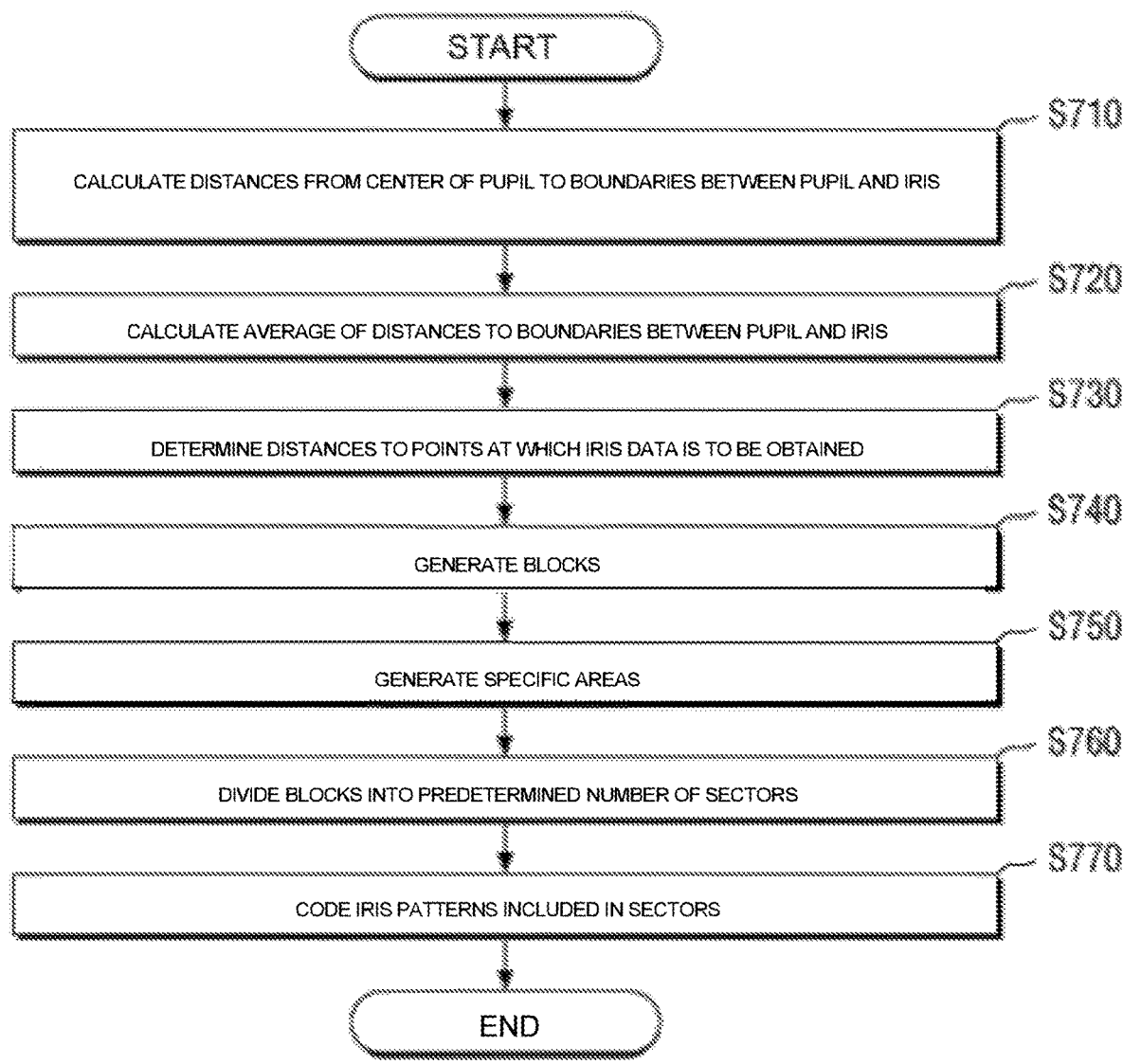
FIG. 7 is a flowchart illustrating a method of coding iris patterns according to an embodiment of the present invention.

FIG. 7 is a flowchart illustrating a method of coding iris patterns according to an embodiment of the present invention.

The method of coding iris patterns according to an embodiment of the present invention includes calculating distances from the center of the pupil to boundaries between the pupil and the iris in S710. Here, the calculation of the distances to the boundaries may be performed within a predetermined angular range. Specifically, the distances from the center of the pupil to the boundaries between the pupil and the iris may be calculated by a predetermined first angular interval.

Afterwards, an average of the distances from the center of the pupil to the boundaries between the pupil and the iris is calculated by the predetermined second angular interval in S720. If the second angle is ε° according to an embodiment of the present invention, an average of distances to boundaries at an angle of rotation $\theta_\alpha \le \theta \le \theta_\alpha + \varepsilon$, an average of distances to boundaries at an angle of rotation $\theta_\alpha + \varepsilon \le \theta \le \theta_\alpha + 2\varepsilon$, and the like, may be sequentially calculated.

Subsequently, distances from the boundaries between the pupil and the iris to points at which the iris data is to be obtained are determined by the second angular interval in S730. The distances to the points at which the iris data is to be obtained according to an embodiment of the present invention may be determined by adding a predetermined distance to the boundaries between the pupil and the iris.

Here, the predetermined distance added to the boundaries between the pupil and the iris may vary depending on the angle of rotation. For example, a greater value may be added to portions located to the right and left of the iris, in which possibility that the iris may be covered with the eyelid is lower, than to a portion located below the iris, in which possibility that the iris may be covered with the eyelid is higher.

Afterwards, blocks may be generated from pixels located in the area between the boundaries between the pupil and the iris and the points at which the iris data is to be obtained in S740. Afterwards, specific areas are generated by aligning the pixels of the blocks in accordance with the distance in S750.

When the positional information of the pixels in the specific areas is specified by the above-described process, the blocks are divided into a predetermined number of sectors 760. Afterwards, iris patterns in the respective sectors are coded in S770.

Since the above-described method of coding iris patterns according to an embodiment of the present invention is realized on the assumption that the pupil and the iris of the user are not circular, this method can obtain the effect of minimizing the occurrence of errors compared to cases in which iris patterns are coded on the assumption that the pupil and the iris are circular.

Figure 8:
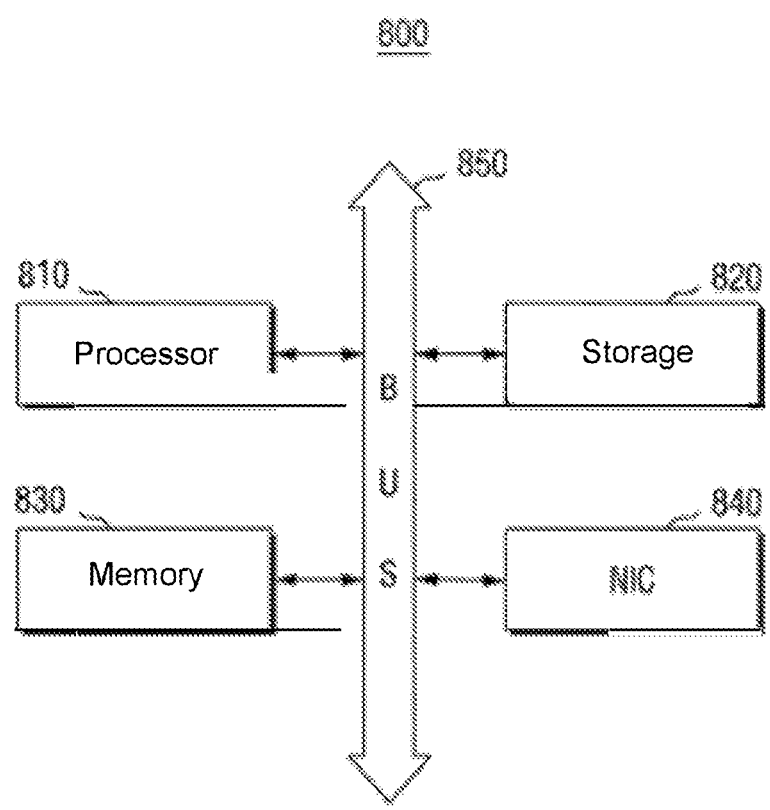
FIG. 8 is a functional block diagram illustrating an apparatus for coding iris patterns according to an embodiment of the present invention.

FIG. 8 is a functional block diagram illustrating an apparatus for coding iris patterns according to an embodiment of the present invention.

FIG. 8 only illustrates components related to an embodiment of the present invention. Thus, it will be apparent to those skilled in the art to which the present invention pertains that general-use components other than the components illustrated in FIG. 8 may be provided.

A processor 810 executes a program able to code iris patterns. However, the program that the processor 810 can execute is not limited thereto, and other general-use programs may be executed by the processor.

The program able to code iris patterns is stored in a storage 820. The program able to code iris patterns according to an embodiment of the present invention includes: a step of calculating distances from the center of the pupil to boundaries between the pupil and the iris; a step of calculating an average of the distances from the center of the pupil to the boundaries between the pupil and the iris by a predetermined second angular interval; a step of determining distances from the boundaries between the pupil and the iris to points at which the iris data is to be obtained by the second angular interval; a step of generating blocks from pixels included in an area from the boundaries between the pupil and the iris to the points at which the iris data is to be obtained; a step of generating specific areas by aligning the pixels of the blocks in accordance with the distance; a step of dividing the blocks into a predetermined number of sectors in accordance with positional information of the pixels of the specific areas; and a step of coding iris patterns included in the sectors.

The memory 830 may load the program able to code iris patterns so that the program can be executed by the processor 810.

A computing system may be connected to a network interface 840. A bus 850 serves as a data transmission path by which the processor 810, the storage 820, the memory 830, and the network interface 840 as described above are connected.

The above-described method may be embodied as a computer readable program, and may be executed by a general-use digital computer operating the program using a computer readable recording medium. In addition, the structure of data used in the above-described method may be recorded in the computer readable recording medium using a variety of means. Examples of the computer readable recording medium may include, but are not limited to, magnetic storage media (e.g. read-only memory (ROM), a floppy disk, and a hard disk) and optical storage devices (e.g. a compact disc read-only memory (CD-ROM) and a digital versatile disc (DVD)).

It will be apparent to those skilled in the art to which the embodiments of the present invention pertain that a variety of modifications are possible without departing from the essential characteristics of the present disclosure. Therefore, the above-described methods shall be interpreted as being illustrative while not being limitative. It should be understood that the scope of the present invention shall be defined by the appended Claims and all of their equivalents fall within the scope of the present disclosure.

What is claimed is:

1. A method of coding iris patterns, the method comprising steps of:
    calculating distances from a center of a pupil to boundaries between the pupil and an iris;
    calculating an average of the distances from the center of the pupil to the boundaries between the pupil and the iris by a predetermined second angular interval;
    determining distances from the boundaries between the pupil and the iris to points at which iris data is to be obtained by the second angular interval;
    generating blocks from pixels included in an area from the boundaries between the pupil and the iris to the points at which the iris data is to be obtained;
    generating specific areas by aligning the pixels of the blocks in accordance with distances;
    dividing the blocks into a predetermined number of sectors in accordance with positional information of the pixels of the specific areas; and
    coding iris patterns included in the sectors.

2. The method according to claim 1, wherein, in the step of calculating the distances from the center of the pupil to the boundaries between the pupil and the iris, the distances from the center of the pupil to the boundaries between the pupil and the iris are calculated within a predetermined angular range by a predetermined first angular interval.

3. The method according to claim 1, wherein the step of determining the distances from the boundaries between the pupil and the iris to the points at which the iris data is to be obtained comprises a step of determining the distances to the points at which the iris data is to be obtained by adding a predetermined distance to the boundaries between the pupil and the iris.

4. The method according to claim 3, wherein the step of determining the distances to the points at which the iris data is to be obtained by adding the predetermined distance to the boundaries between the pupil and the iris comprises a step of determining the distances to the points at which the iris data is to be obtained by adding distances varying in accordance with angles of rotation.

5. The method according to claim 4, wherein the step of determining the distances to the points at which the iris data is to be obtained by adding the distances varying in accordance with the angles of rotation comprises determining the distances to the points at which the iris data is to be obtained by adding greater values to portions in lateral direction of the pupil than values added to a portion in a downward direction of the pupil.

6. The method according to claim 1, wherein the step of generating the blocks comprises a step of generating the blocks including the pixels, with a distance from the center of the pupil of each of the pixels being a distance between an average of the distances to the boundaries between the pupil and the iris and a corresponding point at which the iris data is to be obtained, and an angle of rotation of each of respective pixels being in an area defined by the following formula:

$\theta_\alpha+(n-1)\cdot\varepsilon \leq \theta \leq \theta_\alpha+n\cdot\varepsilon$, wherein n is an integer equal to or greater than 1, θ is the angle of rotation of each of the respective pixels, $\theta_\alpha$ is an angle of rotation boundary, and ε is the second angular interval.

7. The method according to claim 1, wherein the step of generating the specific areas by aligning the pixels of the blocks in accordance with the distances comprises a step of generating the specific areas by aligning the pixels having the same distances from the center of the pupil.

8. An apparatus for coding iris patterns, the apparatus comprising:
    at least one processor;
    a memory loading a computer program executed by the at least one processor; and
    a storage storing the computer program able to code iris patterns,
    wherein the computer program comprises operations of:
        calculating distances from a center of a pupil to boundaries between the pupil and an iris;
        calculating an average of the distances from the center of the pupil to the boundaries between the pupil and the iris by a predetermined second angular interval;
        determining distances from the boundaries between the pupil and the iris to points at which iris data is to be obtained by the second angular interval;

generating blocks from pixels included in an area from the boundaries between the pupil and the iris to the points at which the iris data is to be obtained;

generating specific areas by aligning the pixels of the blocks in accordance with distances;

dividing the blocks into a predetermined number of sectors in accordance with positional information of the pixels of the specific areas; and coding iris patterns included in the sectors.

* * * * *